（12） United States Patent
Zainudin

(10) Patent No.: US 12,082,593 B2
(45) Date of Patent: Sep. 10, 2024

(54) ANTI-SPOILAGE FRESHNESS PRESERVATION FORMULATION AND METHOD FOR MAKING SAME

(71) Applicant: Ryp Labs, Inc., Bothell, WA (US)

(72) Inventor: Mohd Zhafri B. Zainudin, Negeri Sembilan (MY)

(73) Assignee: Ryp Labs, Inc., Bothell, WA (US)

( * ) Notice: Subject to any disclaimer, the term of this patent is extended or adjusted under 35 U.S.C. 154(b) by 112 days.

(21) Appl. No.: 16/768,612

(22) PCT Filed: Jan. 31, 2018

(86) PCT No.: PCT/US2018/016250
§ 371 (c)(1),
(2) Date: May 29, 2020

(87) PCT Pub. No.: WO2019/108241
PCT Pub. Date: Jun. 6, 2019

(65) Prior Publication Data
US 2021/0169095 A1    Jun. 10, 2021

(30) Foreign Application Priority Data
Nov. 29, 2017   (MY) .............................. 2017001748

(51) Int. Cl.
| A23B 7/157 | (2006.01) |
| A01N 3/00 | (2006.01) |
| A01N 25/24 | (2006.01) |
| A01N 25/34 | (2006.01) |
| A01N 59/08 | (2006.01) |
| A23B 7/154 | (2006.01) |
| A23B 7/159 | (2006.01) |
| A23L 3/3472 | (2006.01) |
| A23L 3/358 | (2006.01) |
| A23L 3/3598 | (2006.01) |
| B31D 1/02 | (2006.01) |
| C09J 7/21 | (2018.01) |
| C09J 7/38 | (2018.01) |

(52) U.S. Cl.
CPC ............... *A23B 7/157* (2013.01); *A01N 3/00* (2013.01); *A01N 25/24* (2013.01); *A01N 25/34* (2013.01); *A01N 59/08* (2013.01); *A23B 7/154* (2013.01); *A23B 7/159* (2013.01); *A23L 3/3472* (2013.01); *A23L 3/358* (2013.01); *A23L 3/3598* (2013.01); *B31D 1/021* (2013.01); *C09J 7/21* (2018.01); *C09J 7/38* (2018.01); *A23V 2002/00* (2013.01); *B31D 2201/02* (2013.01); *C09J 2301/41* (2020.08); *C09J 2400/22* (2013.01); *C09J 2400/283* (2013.01)

(58) Field of Classification Search
CPC ......... A23B 7/157; A23B 7/154; A23B 7/159; C09J 7/21; C09J 7/38; C09J 2301/41; C09J 2400/22; C09J 2400/283; A01N 3/00; A01N 25/24; A01N 25/34; A01N 59/08; A23L 3/3472; A23L 3/358; A23L 3/3598; B31D 1/021; B31D 2201/02; A23V 2002/00
See application file for complete search history.

(56) References Cited

U.S. PATENT DOCUMENTS

| 1,958,462 | A | 5/1934 | Baumer |
| 6,780,449 | B2 | 8/2004 | Razaa |
| 7,108,879 | B2 | 9/2006 | Schur |
| 7,497,623 | B2 | 3/2009 | Thomas et al. |
| 7,708,822 | B2 | 5/2010 | Lahav et al. |
| 8,753,676 | B2 | 6/2014 | Kritzman et al. |
| 8,933,007 | B1 * | 1/2015 | Perry ................... A61K 8/9789 510/141 |
| 9,210,926 | B2 | 12/2015 | Markus et al. |
| 9,717,240 | B2 | 8/2017 | Markus et al. |
| 10,308,727 | B2 | 6/2019 | Michihata et al. |
| 10,400,128 | B2 | 9/2019 | Zhao et al. |
| 10,843,997 | B2 | 11/2020 | Bakus, II et al. |
| 10,966,443 | B2 | 4/2021 | Castro Rosas et al. |
| 11,028,030 | B2 | 6/2021 | Bakus, II et al. |
| 11,046,858 | B2 | 6/2021 | Zhao et al. |
| 2004/0137202 | A1 | 7/2004 | Hamilton et al. |
| 2004/0241288 | A1 * | 12/2004 | Lahav ..................... A23B 7/16 424/746 |
| 2007/0280982 | A1 | 12/2007 | Ono et al. |

(Continued)

FOREIGN PATENT DOCUMENTS

| JP | 2005-295987 A | 10/2005 |
| JP | 4540170 B2 | 9/2010 |

(Continued)

OTHER PUBLICATIONS

L.T. Danh, et al. "Antioxidant activity, yield and chemical composition of lavender essential oil extracted by supercritical CO2," J. of Supercritical Fluids 70 (2012) 27-34. (Year: 2012).*
M. Carpena, et al. "Essential Oils and Their Application on Active Packaging Systems: A Review," Resources 2021, 10, 7, 1-20. (Year: 2021).*
International Search Report and Written Opinion, mailed Apr. 25, 2018, for International Application No. PCT/US2018/016250. (9 pages).

(Continued)

*Primary Examiner* — Michael P Cohen
(74) *Attorney, Agent, or Firm* — Seed IP Law Group LLP

(57) ABSTRACT

The present disclosure generally relates to an anti-spoiling, freshness-preserving formulation comprising ionized salt, method for making ionized salt for extending shelf life of fruit and the like. The method comprises treating a refine salt to form a salt crystal, diluting the salt crystal in a bath of essential oil to from a salt melt, ionizing the salt melt to form ionized salt and locking the ionized salt in a solid state.

12 Claims, 9 Drawing Sheets

(56) References Cited

U.S. PATENT DOCUMENTS

| | | |
|---|---|---|
| 2011/0236544 A1 | 9/2011 | Bortoletto et al. |
| 2011/0244095 A1* | 10/2011 | Sardo .................. A23L 3/3508 426/302 |
| 2012/0045555 A1* | 2/2012 | Ricks .................. A23L 3/3508 426/654 |
| 2013/0295248 A1 | 11/2013 | Siddoway et al. |
| 2014/0205722 A1 | 7/2014 | Quintanar Guerrero et al. |
| 2015/0025132 A1 | 1/2015 | Hsu et al. |
| 2016/0050914 A1* | 2/2016 | Markus .................. A01N 25/28 424/769 |
| 2016/0213008 A1 | 7/2016 | Tabibzadeh |
| 2017/0135322 A1 | 5/2017 | Kritzman |
| 2017/0245505 A1 | 8/2017 | Gianfagna et al. |
| 2018/0343899 A1 | 12/2018 | Latson et al. |
| 2018/0346236 A1 | 12/2018 | Lanciotti et al. |
| 2018/0360048 A1 | 12/2018 | Kolsky et al. |
| 2019/0002140 A1 | 1/2019 | Riley et al. |
| 2019/0008163 A1 | 1/2019 | Atley |
| 2020/0207533 A1 | 7/2020 | Riley et al. |
| 2020/0214290 A1 | 7/2020 | Hsu et al. |
| 2020/0214305 A1 | 7/2020 | Gomez Hernandez et al. |
| 2020/0230929 A1 | 7/2020 | Bayona et al. |
| 2020/0255173 A1 | 8/2020 | Riley et al. |
| 2020/0329743 A1 | 10/2020 | Malnati Ramos et al. |
| 2020/0375227 A1 | 12/2020 | Castro Rojas et al. |
| 2021/0061537 A1 | 3/2021 | Riley et al. |
| 2021/0169095 A1 | 6/2021 | Zainudin |
| 2021/0261311 A1 | 8/2021 | Xiao et al. |

FOREIGN PATENT DOCUMENTS

| | | | |
|---|---|---|---|
| WO | 94/12041 A1 | 6/1994 | |
| WO | 2016/084094 A1 | 6/2016 | |
| WO | WO-2017055424 A1 * | 4/2017 | ............ A01N 25/10 |

OTHER PUBLICATIONS

Extended European Search Report, mailed Sep. 13, 2021, for European Patent Application No. 18883907. (16 pages).

Pareek et al., "Postharvest physiology and technology of *Annona* fruits," *Food Research International* 44:1741-1751, 2011. (11 pages).

* cited by examiner

ANTI-SPOILAGE FRESHNESS PRESERVATION FORMULATION AND METHOD FOR MAKING SAME

BACKGROUND

Technical Field

The present invention generally relates to a composition for post-harvest treatment of agricultural produce, especially for an anti-spoilage freshness preservation formulation and method for making same.

Description of the Related Art

Fruits, especially tropical fruits such as mango, mangosteen, and, dragon fruits to name a few, perish rather quickly due to decay caused by bacterial activity, making their shelf life too short for many profitable activity. Even though each tropical fruit has a high demand, many retailers are shying away from marketing them due to high uncertainty because of their short shelf life. Further, even though these fruits have a good potential of making to the international market, there would be very few retailers who are willing to risk their investment.

There have been numerous attempts to extend the shelf life of these fruits, but in many instances it involves a high investment for heavy machinery and sophisticated equipment. One of the more common and traditional way to prevent spoilage is by washing the fruits using preservatives. The washing may be done by running the fruits through a bath of preservative or by spraying the fruits with the preservative and the most common and old form of preservative is common salt, i.e., sodium chloride. This process involves big and expensive equipment making it beyond the reach of many small grocers. Further, the process is slow, bulky and always messy thus unhygienic to some extent. In many instances the fruits are in thick layer going into the bath such that the wash is incomplete, resulting in inadequate preservation, which in turn leads to unwarranted premature decay to some of the fruits.

Another form of preservation for extending shelf life of fruit is by subjecting the fruits to an irradiation of gamma ray that kills the decay-causing bacteria. This process is costly and beyond the reach of many small grocers, as it involves big machinery for the conveying system and expensive and sophisticated gamma ray generator. In many instances the irradiation is not reaching evenly to all the fruit in the conveyor, making the process less efficient than expected.

The most recent attempt at freshness preservation is carried out by the same applicant of the present application using ionized salt impregnated into a sticker, as disclosed in MY-A-2014 000 269 titled "A kit for extending shelf life of fruit and the like." In brief, common table salt or sodium chloride is purified and ionized and held in ionized stage by beeswax. The ionized salt is then transferred to a carrier in the form of a paper sticker. In use, the sticker is simply attached to the fruits and the ionized salt help absorb moisture from the fruit and hence making the fruits less vulnerable to bacterial activity that causes decay. However, the process disclosed in MY-A-2014 000 269 could be challenging when transferring the ionized salt onto the carrier because the ionized salt is uneven, and thus resulting in stickers with inconsistent quality and thus inconsistent effect.

Therefore, there is a need to provide a new composition and method for producing the ionized salt that will be more even and thus eliminate the above problem.

BRIEF SUMMARY

Accordingly, the present disclosure provides a new anti-spoiling, freshness-preserving formulation comprising ionized salt capable of extending shelf life of fresh produce (e.g., fruits, vegetables and the like), and method for making the same.

One specific embodiment provides an anti-spoilage, freshness-preservation formulation comprising: a salt melt including ionized sodium chloride admixed with an essential oil; and a waxy matrix in which the salt melt is suspended.

The anti-spoiling, freshness-preserving formulation may be coated on a sticker and the sticker be affixed to the produce. Thus, one embodiment provides a self-adhesive sticker comprises: a porous sticker body having an adhesive surface and a coating surface opposite to each other; an adhesive present on the adhesive surface; and an anti-spoilage, freshness-preservation formulation being coated on the coating surface and being impregnated in the porous sticker body; wherein the anti-spoilage, freshness-preservation formulation comprises a salt melt including ionized sodium chloride admixed with an essential oil; and a waxy matrix in which the salt melt is suspended.

In addition to stickers, labels and tags coated with the anti-spoiling, freshness-preserving formulation, can also be directly affixed to the skin of the fresh produce, or be placed in the proximity of the fresh produce (e.g., on a packaging container). The formulation can also be sprayed directly on the produce, or on the container or package material of the produce. Alternatively, the produce may be dipped in a bath of the formulation (e.g., at a temperature whereby the formulation is softened).

Another embodiment provides a new method for making ionized salt that is easy to execute and coat on a carrier.

Yet another embodiment provides a new method for making ionized salt that produces consistent quality.

One embodiment thus provides a method for making ionized salt capable of extending shelf life of fruit and the like comprising: treating a refined salt to form a salt crystal; diluting said salt crystal in a bath of essential oil to form a salt melt; ionizing said salt melt to form ionized salt; and locking or suspending said ionized salt in a solid state.

BRIEF DESCRIPTION OF THE SEVERAL VIEWS OF THE DRAWINGS

Other embodiments of the present invention and their advantages will be discerned after studying the Detailed Description in conjunction with the accompanying drawings in which.

DETAILED DESCRIPTION

Figure 1A:
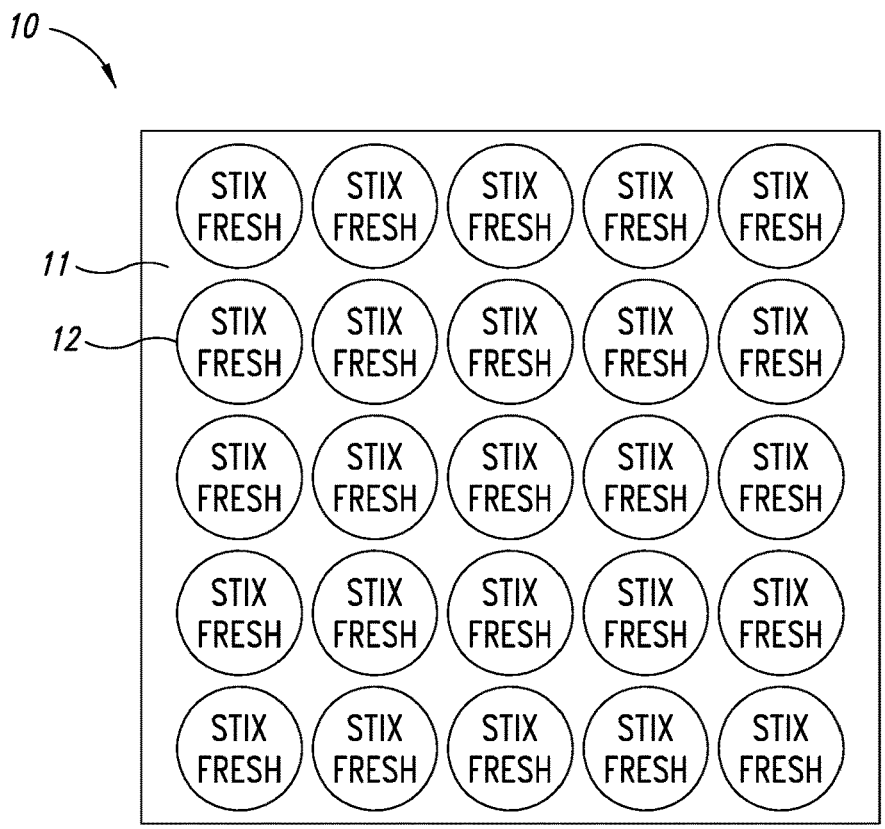
FIG. 1A shows a sticker kit according to one embodiment of the present invention.

The present invention generally relates to an anti-spoiling and freshness-preservation formulation comprising ionized salt capable for extending shelf life of fresh produce (e.g., fruits, vegetables and the like) and methods for making the same. Without wishing to be bound to the theory, it is believed that the underlying principle of the present disclosure is to convert salt into an ionized state so that the ionized salt is active and would readily absorb moisture from fresh produce such as fruits, vegetables and the like, making them less vulnerable to diseases. It is further believed that the environment caused by the activated, ionic salt in the formulation is hostile and inhabitable to disease-causing microorganisms such as bacteria, molds or yeasts. Lastly, it is also believed that, at least in some incidents, the formulation attracts and absorbs ethylene released by the product, thus delaying or arresting over-ripening. The ionized salt is held in suspension in a wax that acts as a matrix to hold the ionized salt in an ionized state. The process of making the ionized salt uses a double refined rock salt that is very fine (almost in powder form) as the starter material. The double refined rock salt is added to filter water, (e.g., produced by reverse osmosis), and is subjected to slow heating under sunlight until all the water evaporates, leaving pure salt in comparatively large crystals. The large crystal is then mixed with an essential oil to form a salt melt. In the next process the salt melt is mixed with a wax (e.g., beeswax or petroleum-based wax) and is subjected to a slow heating that ionizes the salt. The ionized salt is held in suspension in the wax. When the wax is cured, it solidifies and holds the ionized salt in suspension in a solid state, making it easy for further handling and application.

Thus, one embodiment provides an anti-spoilage, freshness-preservation formulation comprising a salt melt suspended in a waxy matrix, wherein the salt melt includes ionized sodium chloride crystals admixed with an essential oil.

As used herein, an essential oil refers to natural, plant-derived oil or oil blend that are generally rich in monounsaturated or polyunsaturated fatty acids such as oleic acid, linoleic acid, alpha-linolenic acid, gondoic acid, and the like. In addition to the unsaturated fatty acid contents, suitable essential oil may further contain minor amounts of saturated fatty acid such as palmitic acid, stearic acid, etc. Varying amounts of other components such as vitamin E may also be present. The essential oil is derived from plants, and more specifically from nuts or seeds. Examples of suitable essential oil include, without limitation, almond (*Prunus dulcis*) oil (e.g., sweet almond oil), grapeseed oil, walnut oil, jojoba oil, olive oil, and the like.

In other embodiments, the essential oil may be terpene-based oils. A number of plant-derived oils are rich in terpenes, which include a wide range of volatile organic substances having one or more units of isoprenes or isoprenoids (e.g., isoprene derivatives having functional groups such as hydroxy, aldehyde, ester and the like). Terpene-based oils typically are mixtures of terpenes or terpenoids, such as monoterpene or monoterpenoids (e.g., linalool, linalyl acetate), terpenes, sesquiterpenes, etc. Examples of terpene-based essential oil include, without limitation, lavender oil, coriander oil, geranium oil, sweet basil oil, and the like.

Typically, the essential oil is liquid at room temperature (20° C.-25° C.). The essential oils suitable for the present disclosure are typically commercially available and preferably refined. In a preferred embodiment, the essential oil is sweet almond oil which typically contains about 60-70% oleic acid and 20-30% of linoleic acid. In other embodiment, two or more essential oils may be present. In a preferred embodiment, an unsaturated fatty acid and a terpene-based oil may both be present in the formulation.

In forming the salt melt, the salt crystals and the essential oil may be admixed in any relative amounts such that a uniform melt can be produced. In various embodiments, the salt and essential oil are at a ratio (v/v) of 0.05-0.50, or 0.10-0.50, 0.1-0.40, or 0.15-0.40, or 0.15-0.35, or 0.15-0.30, or 0.20-0.30; or 0.25-0.30, and the like.

As used herein, a wax refers to an organic substance having saturated, long aliphatic chains of at least 8 carbons to up to 60 carbons. In various embodiments, the chain lengths may comprise 10, 12, 14, 16, 18, 20, 22, 24, 26, 28, 30, 32, 34, 36, 38, 40, 42, 44, 46, 48, 50, 52, 54, 56, 58 or 60 carbons. Wax is typically solid or semi-solid at room temperature and becomes more malleable as temperature rises. Suitable wax may be derived from natural sources such as animals (including insects) and plants, or may be derived from petroleum products.

Although petroleum-based wax are typically long-chain alkanes (containing only hydrogen and carbons), animal or plant-derived wax may comprise long-chain or fatty alcohols, fatty acids, or fatty acid esters, in addition to alkanes. In a preferred embodiment, the wax is beeswax (e.g., Kahlwax 1540 by KAHL GMBH & Co. KG). Typically, beeswax comprises, as a majority component, myricyl palmitate, which is the esterification product of a fatty acid (C16 palmitic acid) and a fatty alcohol (C30 myricyl alcohol).

Plant-derived wax includes for example, candelilla wax, carnauba wax, soy wax, bayberry wax and the like. Plant-derived wax is typically food safe and has been used in the food industry as substitutes for beeswax.

Petroleum-based wax may be a paraffin which is a mixture of alkanes (having no unsaturation) of various chain lengths, typically in the 20-40 carbons range. Paraffins are chemically inert and are typically considered food safe.

Regardless of the sources of the wax, the melting point of the wax is preferably in the range of 37° C. to 80° C. Beeswax has a melting point of 62-64° C. Paraffins (depending on the constituent alkanes) may have melting points in the range of 37° C. to 68° C. It is noted that the "melting point," as used herein, refers to the temperature at which the wax begins to melt (e.g., softening or becoming deformable). It is recognized that unlike crystalline substance, the temperature of wax continues to rise during melting.

The salt melt of rock salt crystals admixed with the essential oil is further combined with a wax at such relative amounts and under conditions (heat and UV rays) to produce a uniform waxy formulation in which ionized salt is suspended or held in an ionized state. In certain embodiment, the salt melt and the wax are at a concentration (v/w) in the range of 0.2-2 ml/kg. In specific embodiments, about 0.5-1.5 ml of salt melt may be mixed with about 800-1350 grams of wax to yield a homogeneous, uniform waxy formulation.

The anti-spoilage, freshness-preservation formulations are suited to extend the shelf-lives of fresh produce such as fruit and vegetables that have skin, peel, rind or any outer membrane that forms a protective layer of the produce. Examples of the fresh fruits include papaw, dragon fruit, kiwi fruit, mango, passion fruit, papaya, pomegranate, rambutan, star fruit, banana, citric fruits (orange, lime, lemon, and the like), prunus family fruits (peach, apricot, nectarine, and the like) and pome fruits (apples, pears and the like). Tropical fruits such as mangos, star fruits and dragon fruits tend to have short self-lives due to a number of factors. For instance, they are typically moisture-rich; they can carry microorganisms that may have thrived in the tropical climate; and they likely require transportation, allowing microorganisms to grow days before shelving at the grocers or reaching the end customers. Tropical fruits thus could particularly benefit from the formulations disclosed herein as the formulations fend off microbial assault without affecting the quality of the fruits.

Suitable vegetables include avocado, cucumber, eggplant, and the like.

The anti-spoilage, freshness-preservation formulations are effective when in direct contact with the fresh produce (e.g., on the skin or peel); or being in close proximity to the fresh produce even without coming into direct contact. These uses are disclosed in further detail below.

One way to directly apply the anti-spoilage, freshness-preservation formulation to fresh produce is to affix a self-adhesive sticker coated and impregnated with the formulation to the fresh produce. The sticker typically has a surface area substantially smaller than surface area of skin of the fresh produce (e.g., fruit) to be preserved. The sticker can be applied to fresh produce at any point of handling, including following harvest, prior to transportation, prior to shelving at the grocers. End users, such as customers, may also apply the stickers directly to the fresh produce to extend the shelf-life at home.

FIG. 1A shows a sticker kit (e.g., a sheet of stickers) according to one embodiment of the present disclosure. The sticker kit (10) comprises a base (i.e., a back liner) (11) and a plurality of stickers (12) arranged regularly on the base (11). The sticker (12) is made from wood-based paper or synthetic paper that is non-toxic. The base (11) may also be a paper or synthetic material.

Any stickers safe for direct contact with fresh produce may be coated with the anti-spoilage, freshness-preservation formulation disclosed herein. To make the sticker kit, the solid ionized salt is first melted by heating and is then applied to the stickers by conventional coating or printing methods known in the art. The coating process can be fully automated.

The body of the stickers is made of a porous material to allow the formulation to penetrate through the entire thickness of the stickers. Typically, the sticker body is made from a wood pulp-based paper, which is naturally porous. The porous material may also be synthetic paper made of porous thermoplastic polymers such as polyolefins embedded with silica particles. Suitable synthetic paper is commercially available under the TESLIN® brand substrate products by PPG Industries.

Figure 1B:
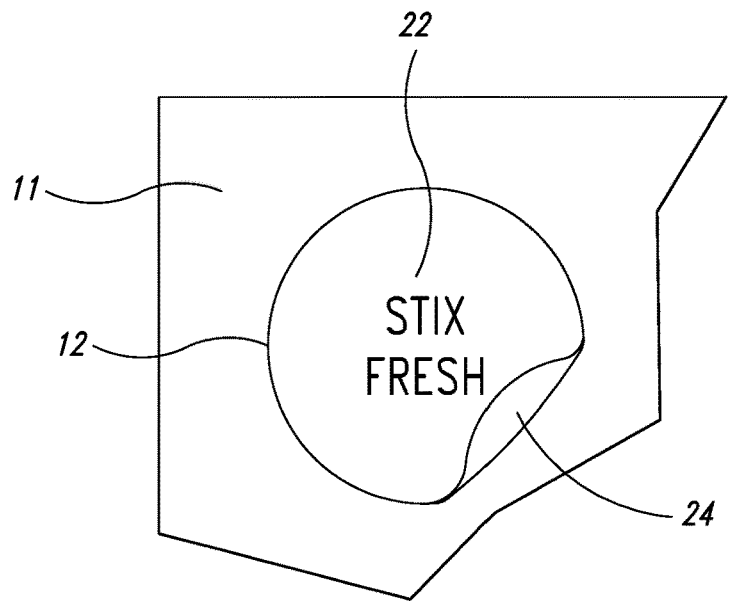
FIG. 1B schematically shows a sticker according to one embodiment.

The sticker body has two opposite surfaces, namely a coating surface (22) and an adhesive surface (24). See FIG. 1B. The adhesive surface (24) is to be affixed to the base (11), which can be detached from the base by peeling, and then affixed to the fresh produce. The adhesive surface has a food-safe adhesive layer. Food safe or food-contact grade adhesives are known to a skilled person in the art. Typically, acrylic-based adhesive (e.g., S692N by Avery Dennison) may be used. The stickers typically are attached to a back liner by the adhesive surface; the stickers are self-adhesive and should be easily released by peeling.

Thus, one embodiment provides a self-adhesive sticker comprises: a porous sticker body having an adhesive surface and a coating surface opposite to each other; an adhesive (e.g., acrylic adhesive) present on the adhesive surface; and an anti-spoilage, freshness-preservation formulation being coated on the coating surface and being impregnated in the porous sticker body; wherein the anti-spoilage, freshness-preservation formulation comprises a salt melt including ionized sodium chloride admixed with an essential oil; and a waxy matrix in which the salt melt is suspended.

On the coating surface, the porous stickers can be coated with the anti-spoilage formulation by any conventional printing or coating methods. The stickers are typically arranged regularly on a large format back liners in sheets or rolls, which may be coated automatically and continuously. Due to their porous structure, the body of the stickers is impregnated with the anti-spoilage formulation comprising ionized salt in ionized state. As discussed herein, the salt is ionized and admixed with an essential oil, which is in turn held evenly in suspension in a carrier such as a wax or the like. When the sticker is affixed to the fruit, the ionized salt will absorb moisture from the fruits and the like, making the fruits and the like less vulnerable to disease. As the ionized salt absorbs moisture, the absorbed moisture will carry along with it disease-causing bacteria and other impurities, thus reducing disease occurrence or severity and extending the shelf life of the fruits and the like.

In other embodiments, the anti-spoilage, fresh preservation formulation disclosed herein may be indirectly associated with and in close proximity to the fresh produce. The formulation may be printed on tags and labels that are attached to the container or bags that hold the fresh produce. The formulation may also be printed or coated directly on the containers. Alternatively, the formulation may be housed in its own containers (e.g., a pod or capsule) and placed near where the fresh produce is stored or displayed.

In yet other embodiments, the anti-spoilage, fresh preservation formulation disclosed herein may be applied directly onto the produce (in the absence of stickers). The formulation may be heated or warmed to a liquid form and applied to the produce in any means, such as spraying, coating, brushing, dipping, etc. The area of coverage on the produce is not limited and can be partial or complete. Because the formulation is clear or semi-clear when hardens, direct coating does not change the appearance of the produce.

A method for making the ionized salt for extending shelf life of fruit and the like is further disclosed in more detail herein. Generally speaking, the method comprises treating a refine salt to form a salt crystal, diluting said salt crystal in a bath of essential oil to from a salt melt, ionizing said salt melt to form ionized salt; and locking said ionized salt in a solid state.

Figure 2A:
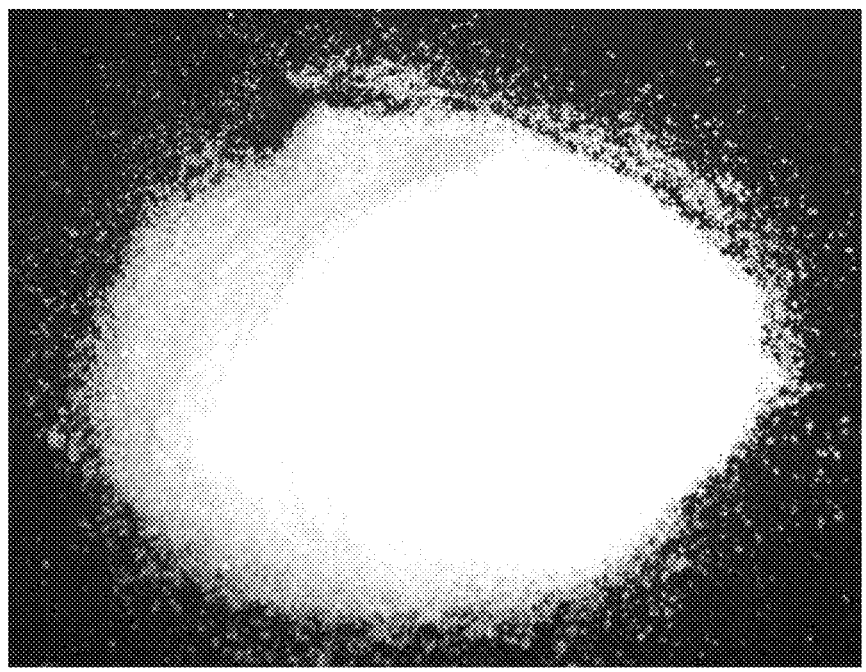
FIG. 2A shows double refine rock salt.
Figure 2A:
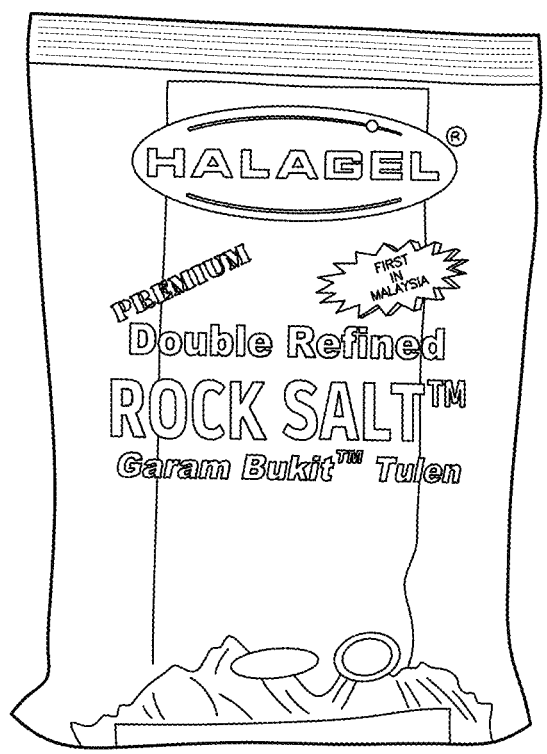

The base material used in the present process is double refined rock salt obtained from the market as this type of salt is the most soluble and gives almost no residue. FIG. 2A shows fine rock salt crystals suitable for the present disclosure. Under normal condition the salt is in fine almost powder stage and is not very reactive with other chemicals. To make it reactive the salt has to be dissolved in water that requires a big space for a bath to wet all the fruit or the like. As earlier mentioned this process has its drawbacks and is not financially attractive to small grocers.

Figure 2B:
FIG. 2B shows energized salt crystal.
Figure 2B:
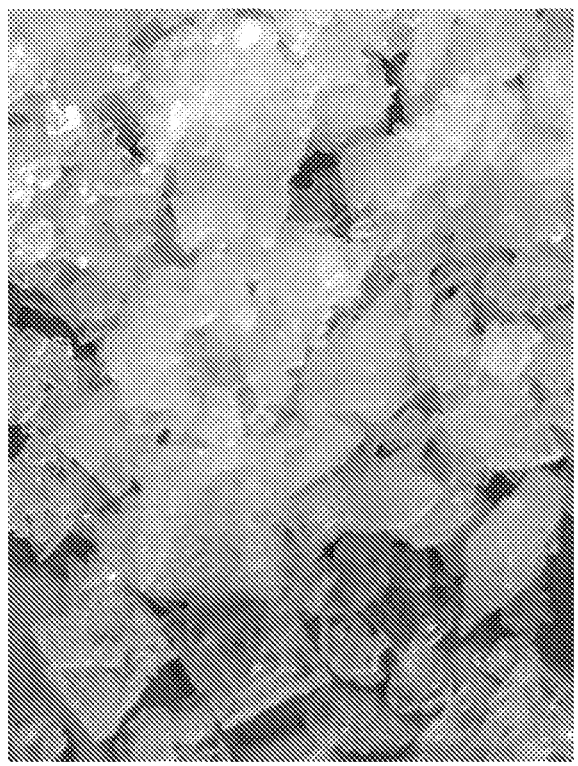

FIG. 2B shows energized salt crystal. The energized salt is in the form of large crystal and is active. It readily dissolves in essential oil to form a melt in preparation for ionization.

Figure 3A:
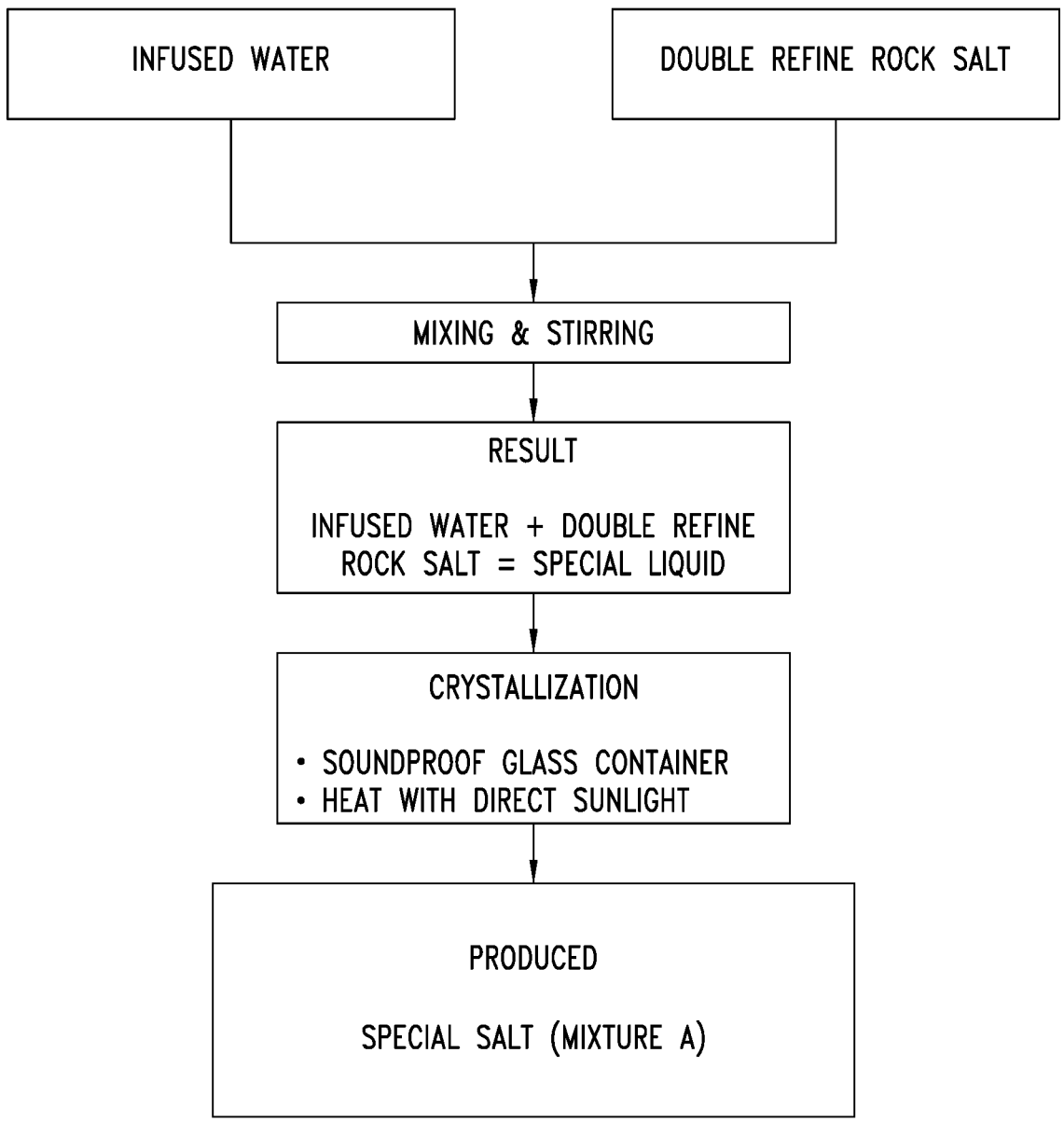
FIG. 3A-3D are flow charts showing preparation processes of the anti-spoilage, freshness-preserving formulation according to certain embodiments.

FIG. 3A shows a process for preparing energized salt crystals. The double refined rock salt is added to filtered water produced by reverse osmosis and subjecting the solution to heating for a period of time. Extensive research and experimentation has revealed around 220-350 grams of double refine rock salt is added to around 500-1750 ml of water (e.g., 0.12-0.7 g/ml concentration) to form a solution that has the right property. The solution is subjected to vigorous stirring until it is uniformly mixed. This is when there is no salt residue left in the solution. The solution is then subjected to slow heating under sunlight to a temperature of between 60° C. to 85° C. for at least two hours until the solution dries up leaving a formation of large salt crystal which is rock salt in its pure form. The slow heating not only purifies the salt but also energized the salt resulting in the formation of large salt crystal that readily dissolved in oil for the next process.

Figure 3B:
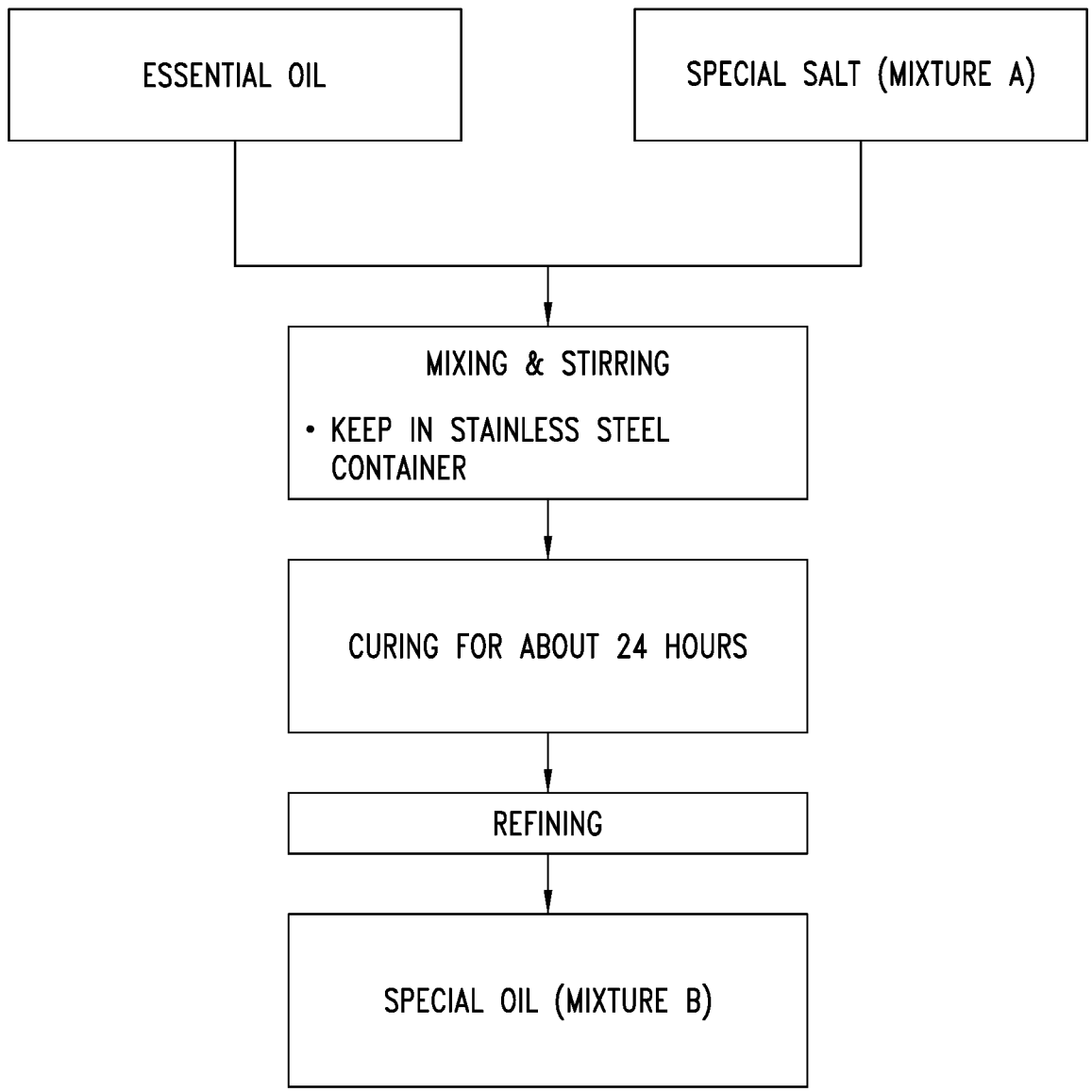

FIG. 3B shows the next process of producing salt melt from the large salt crystal. The large salt crystal is diluted in an essential oil bath to produce the melt to prepare for the next process that is to ionize the salt.

In a specific embodiment and as shown in FIG. 3B, about 210-260 ml of the salt crystal is mixed to around 800-1350 ml of sweet almond oil to produce the melt. Oil is chosen over water for preparing the melt as it gives a more uniform melt and can maintain uniformity for a long time. Any essential oil may be used for making the melt provided that it gives uniform melt and ready machinability. A preferred choice of the essential oil (e.g., sweet almond oil) allows for fast dissolving of the large crystal salt and there is hardly any residue seen after a brief stirring. The melt is left to cure for at least 24 hours, after which the melt is filtered to make it more even and more fluid.

Figure 3C:
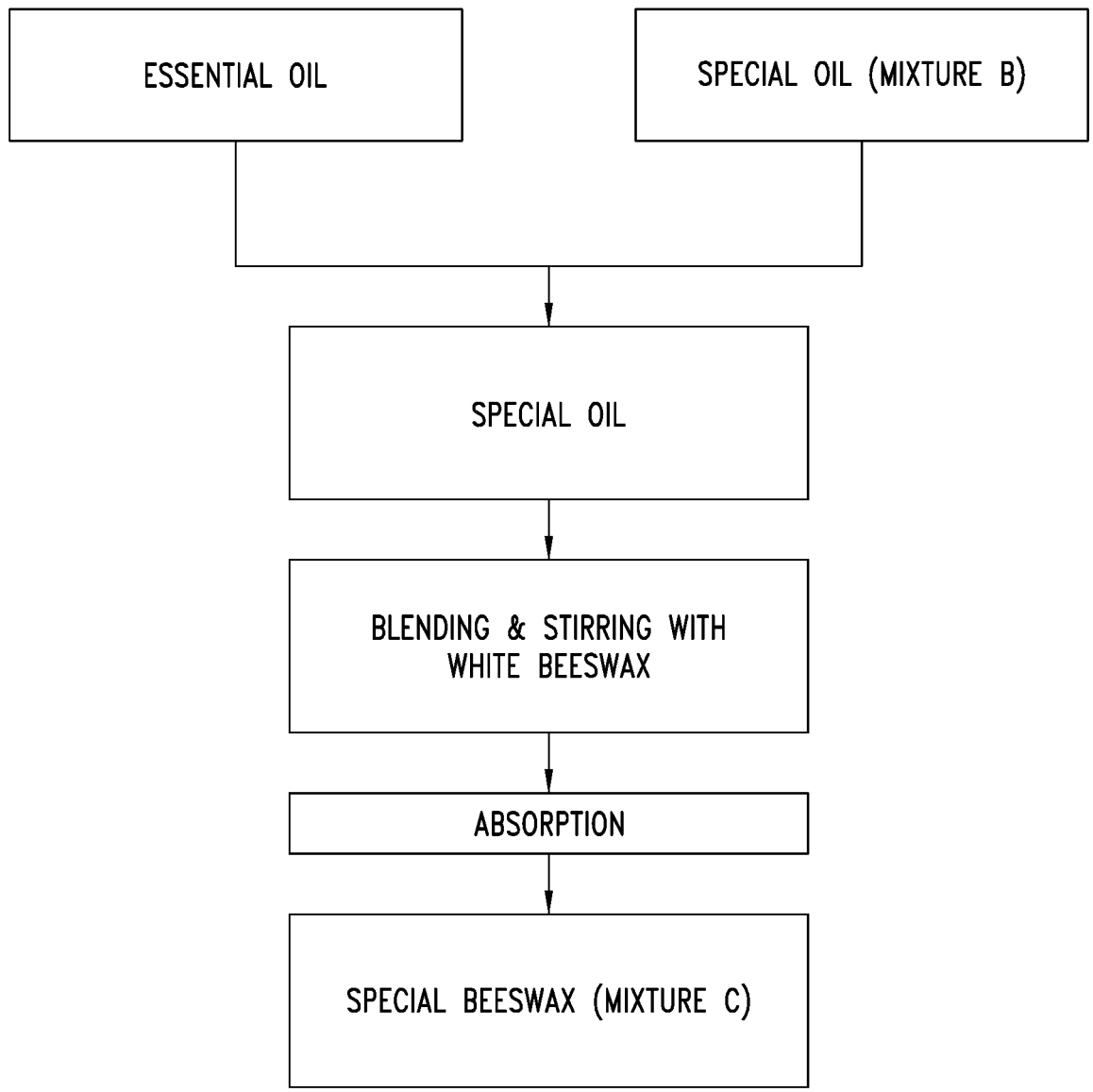

The next process is ionizing the salt melt and locking or suspending the ionized salt in an ionized state in solid form for easier handling. As shown in FIG. 3C, the salt melt may be optionally diluted by a small amount of an essential oil (e.g., terpene-based oil such as lavender and/or geranium oil). Thereafter, about 0.5-1.5 ml of the salt melt is added to around 800-1350 gm beeswax and is stirred vigorously and thoroughly until they form a uniform mix. The mix is slowly heated under natural sunlight at a temperature range of 60° C. to 85° C. for a maximum period of two hours until the mix turns fully into liquid. It is important to note that the heating temperature is critical as too high a heat will burn the wax while too low a heat will not sufficiently melt the wax both of which will fail to cause complete ionization of the salt. Complete ionization is characterized by the mix uniformly even and is gliterring or glistening.

During the slow heating the energy from the sun rays causes the salt in the mix to be ionized to loosen its normal solid crystalline structure into an ionized state. When mix with molten beeswax the ionized salt will be held in suspension in the wax and continuous stirring will ensure the ionized salt is evenly distributed in the wax. The mix is then left to cure for at least 24 hours by which the ionized salt is held in suspension and locked in ionized form by the beeswax in a solid state for easy handling and further application. Complete curing is characterized by the mix loses its glitter. It is to be understood that salt crystal in its natural and pure form is rather inert but has long almost endless life span. The present invention converts the salt into ionized salt to make it very active and lock the salt in suspension and in ionized form and in a solid state.

Figure 3D:
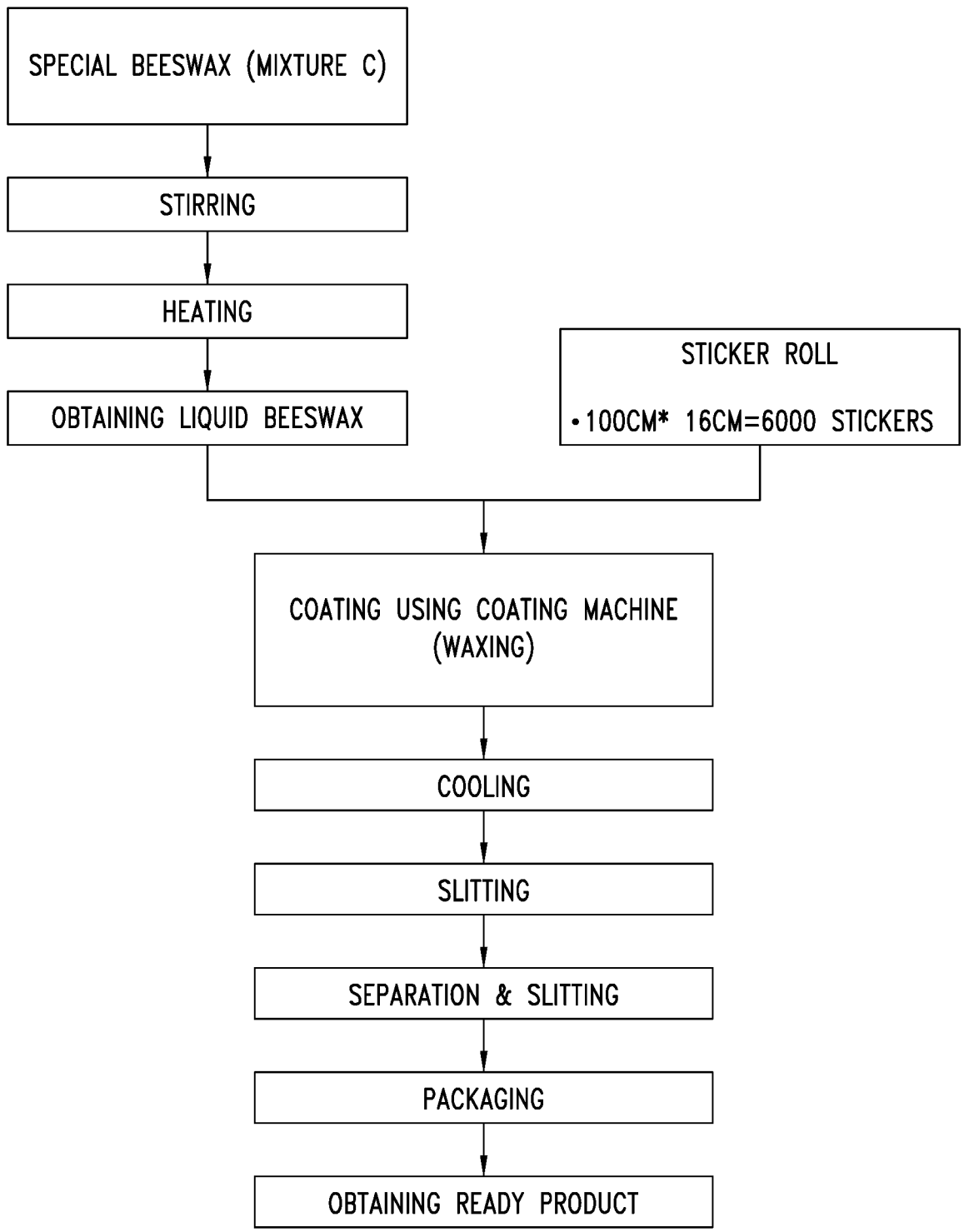

FIG. 3D is a flow chart showing a process of preparing the sticker kit from preparing the anti-spoilage formulation, coating onto stickers (e.g., by automated roll to roll coating), cooling, slitting the sticker rolls into sticker kits (sheets), packaging and ready for use (i.e., to be affixed to produce).

TABLE 1 demonstrates the decaying time of fruits affixed with the stickers of the present disclosure as compared to those without stickers. As seen from the TABLE 1, without the stickers, it took about 3-7 days before the mangoes become bad (e.g., showing rotting spots) and with the stickers on, it took twice as long, i.e., 8-14 days, before the mangoes becomes bad. This shows that there is an extension of 5-7 days delay of decay time for those with stickers. This is a substantial increase of almost 100% of shelf life. Similar results were also observed in starfruits. With stickers, it took around 3-5 days to become bad and with sticker it took around 6-10 days before the starfruits turns bad. There is also a significant increase of more than 100% of shelf life. As for dragon fruits it took around 3-4 days to turn bad without sticker, and with stickers, it took around 5-10 days before the dragon fruits turns bad. Again it shows an increase of more than 100% of shelf life.

TABLE 1

| | OF DAYS TO TURN BAD | | | |
|---|---|---|---|---|
| | Without sticker | | With sticker | |
| TYPE OF FRUIT | Min | Max | Min | Max |
| Mangoes | 3 | 6 | 8 | 14 |
| Starfruits | 3 | 5 | 6 | 10 |
| Dragon Fruits | 3 | 4 | 5 | 10 |

When the sticker (12) is stuck to the fruit skin that is normally permeable, the ionized salt will cause reverse osmosis through the skin to absorb moisture from the fruit and along with will also absorb decay causing organism in the fruit thus help prolong shelf life of the fruit. As test results show in TABLE that the sticker does not significantly affect the quality of the fruit but the sticker reduces disease severity in the fruit to thus prolong its shelf life.

Any conventional, art-accepted methods of monitoring the decay or spoilage may be used for evaluating the effectiveness of the formulation or stickers disclosed herein. It is sometimes sufficient to assess the effectiveness by direct observations based on appearance (e.g., moldy spots, discoloration), firmness, texture and the like. For more quantitative evaluations, pH, vitamin C, soluble solids concentration (SSC) may be measured. Decomposition products such as lactic acid, alcohol, acetoin could also be measures to determine the degrees of the decay.

EXAMPLES

Example 1

Quality of Chok Anan Mango after Using Stixfresh
Introduction
Fresh mangoes are perishable fruit with short shelf life once ripening has initiated. One significant cause for post-harvest losses in mangoes is due to fungal infection. In order to prolong its shelf life, fungicide, heat treatments, coating, and irradiation have been widely used. However, the conventional means have limited success in prolonging the shelf life. Example 1 examines the effectives of a salt-impregnated sticker according to an embodiment of the present disclosure in prolonging shelf life of Chok Anan mango.

Materials and Methods

Mature green Chok Anan mango were bought directly from farm and sent to laboratory within 24 h. The fruit were divided into two groups with two different experiments.
Experiment 1

The first group of fruits was divided equally into two lots where one lot of fruit was served as control (without sticker) and another group of fruit was stick with a sticker. Both lots of fruits were then initiated to ripening using 1 mL/L ethylene for 24 h.
Experiment 2

Another group of fruits was divided equally into two lots. The fruits were initiated to ripening using 1 mL/L ethylene for 24 h. After 24 h, one of the fruit lot was stick with a sticker, while another lot of fruit served as control (without sticker).

Then, both groups of fruit were allowed to ripen in room of 27° C./57% relative humidity for 8 days. Fruits were analyzed every two days using two fruits per treatment. Pulp firmness was evaluated using a Bishop Penetrometer FT 327 (Alfonsine, Italy). The force required for an 11-mm probe to penetrate the cut surface in two opposite locations to a depth of 8 mm was recorded. The penetration force was expressed in Newtons. Soluble solids concentration (SSC) was measured using juice extracted from fruit pulp using a refractometer (Model N1, Atago Co., Ltd., Tokyo, Japan) to obtain the % SSC. The remainder of the juice from the SSC determination was used to measure titratable acidity by titrating with 0.1 mol/L NaOH. The results were calculated as a percentage citric acid. The pH of the juice was measured using a glass electrode pH meter (CRISON GLP 21, Barcelona, Spain). The vitamin C content was determined according to Ranganna (1977). Disease appearing on the surface of the fruits was assessed according to the percentage of disease area affected per fruit. The percentage score was then related to a 5-point scale, where 0=0% area affected (none), 1=1.5% area affected (slight), 2=6-15% area affected (mild), 3=16-30% area affected (moderate) and 4=31-100% area affected (severe).
Statistical Analysis The experimental design for both experiments was a completely randomized design. The treatments were a 2×5 factorial arrangement with two treatments (control and sticker-affixed fruit) and five evaluation days. Data were analyzed using ANOVA (SAS 9.1) and separation of means was carried out using Duncan's multiple range test.
Results and Discussion
Experiment 1

Figure 4A:
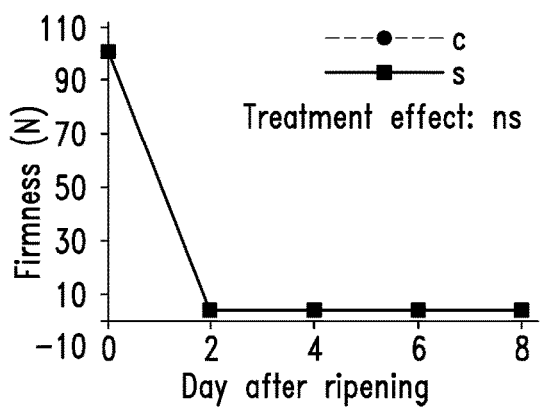
FIG. 4A-4F demonstrate the effect of a coated sticker according to an embodiment on fruit firmness (4A), soluble solids concentration (4B), titratable acidity (4C), pH (4D), vitamin C (4E), and disease incidence (4F) of Chok Anan mango fruit during 8 days of ripening. Stixfresh was stick to fruit before ripening initiation was carried out using ethylene for 24 h. (n.s., Non-significant; ***P<0.001 for effect of the sticker treatment).
Figure 4B:
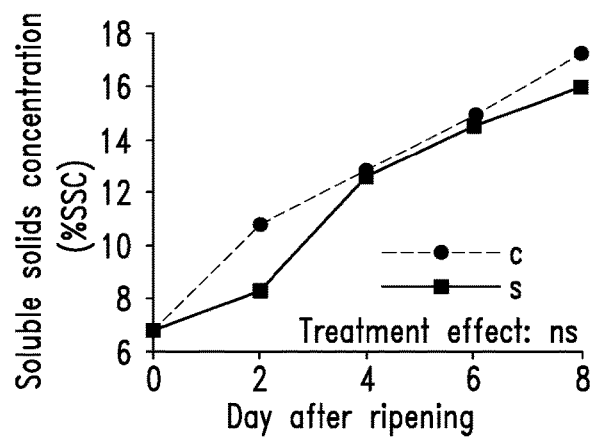
Figure 4C:
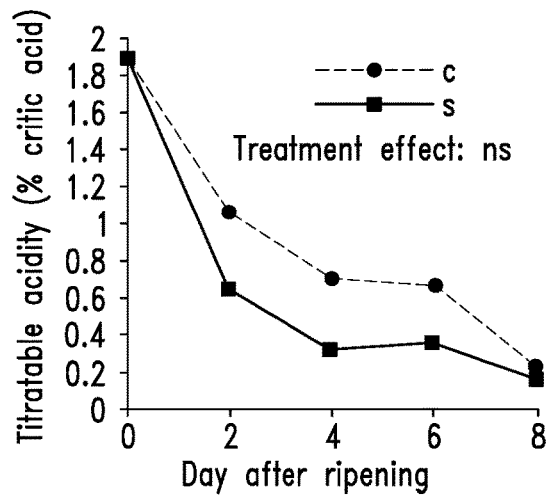
Figure 4D:
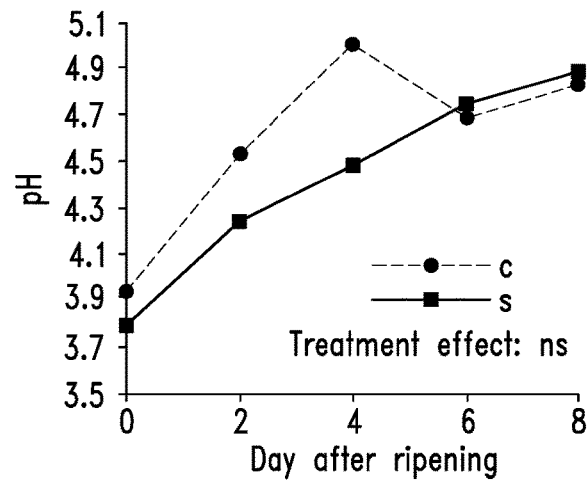
Figure 4E:
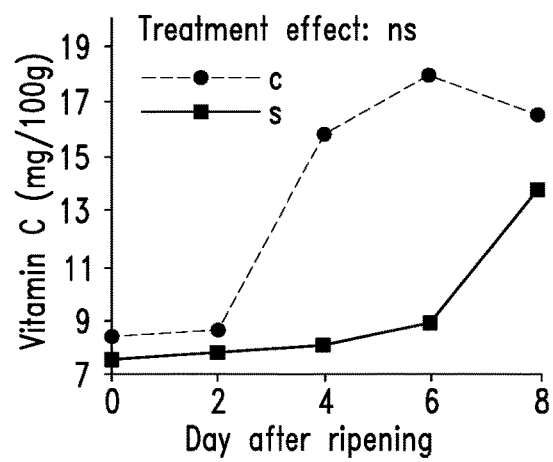
Figure 4F:
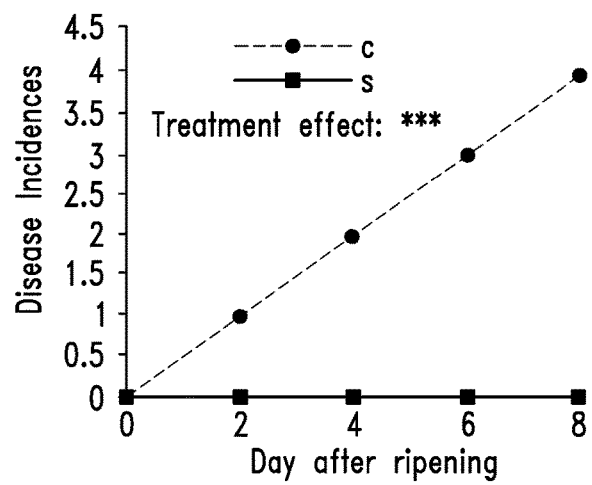

There was no significant difference between control (c) and sticker-affixed (s) fruit in firmness, SSC, TA, pH, and vitamin C (FIGS. 4A-4E) of Chok Anan mango fruit. However, sticker-affixed fruit showed significant lower disease incidence than control fruit (FIG. 4F). This indicated the sticker did not change quality of Chok Anan mango fruit, which is a good indicator. The sticker has improved the resistance of mango fruits towards disease infection and thus the shelf life of fruit can be prolonged. All of the control fruit were infected with disease by day 8, while none of the sticker-applied fruit (out of five samples) showed disease infection by day 8.

Example 2

Figure 5A:
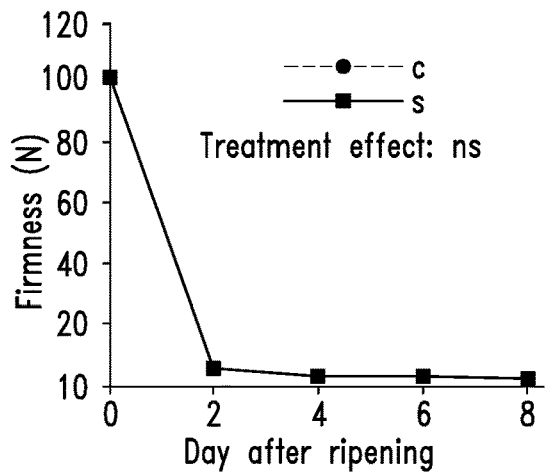
FIG. 5A-5F shows the effect of a coated sticker according to an embodiment on fruit firmness (5A), soluble solids concentration (5B), titratable acidity (5C), pH (5D), vitamin C (5E), and disease incidence (5F) of Chok Anan mango fruit during 8 days of ripening. Stixfresh was stick to fruit after ripening initiation was carried out using ethylene for 24 h (n.s., Non-significant; ***P<0.001 for effect of the sticker treatment).
Figure 5B:
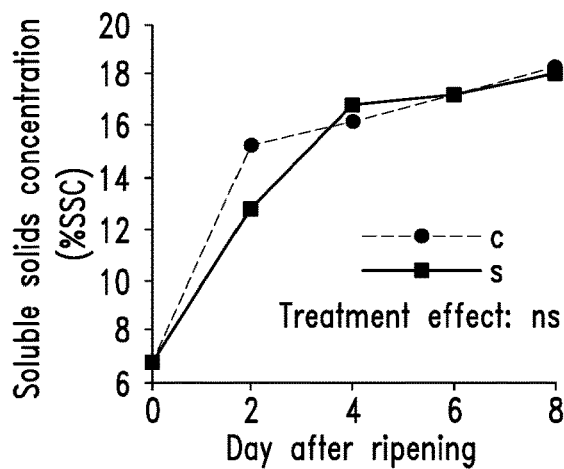
Figure 5C:
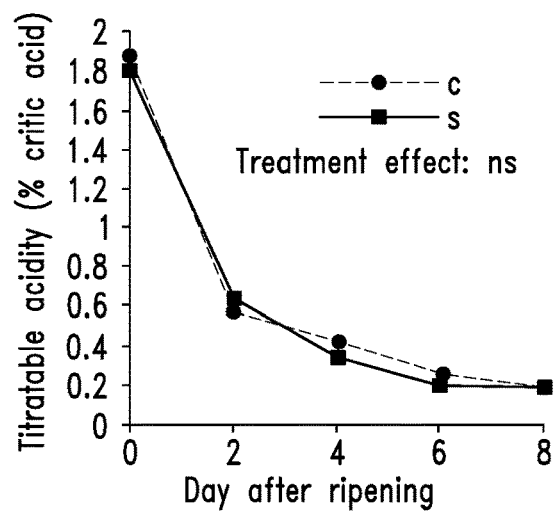
Figure 5D:
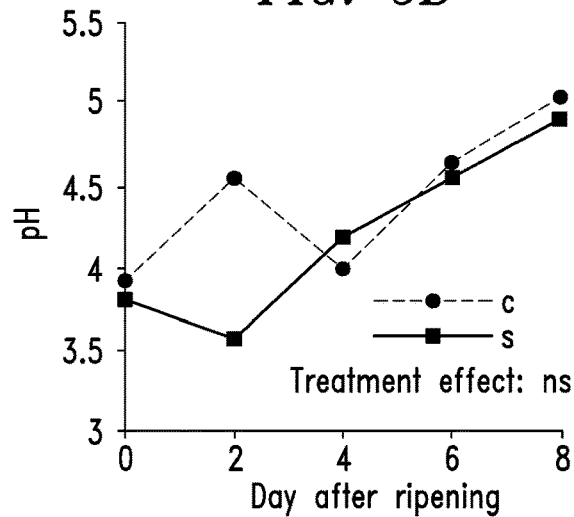
Figure 5E:
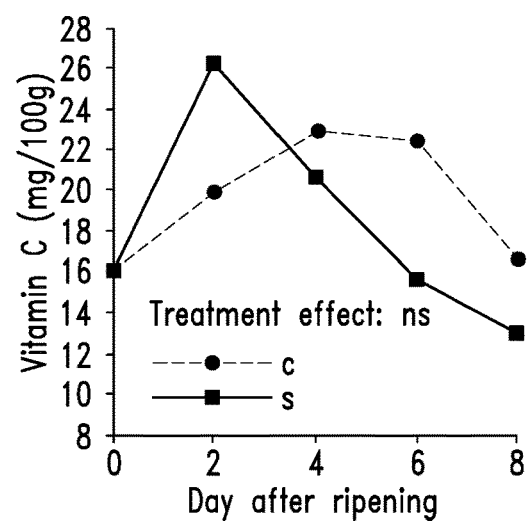
Figure 5F:
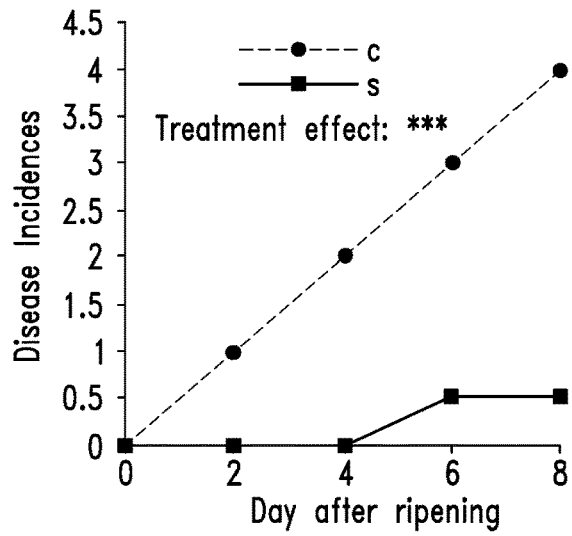

Similar findings were also found in mango fruit that applied with sticker after ripening initiation has been carried out. Control (c) and sticker-applied (s) fruit did not show significant difference in firmness, SSC, TA, pH and vitamin C (FIGS. 5A-5E), indicating that the fruits were well preserved. However, sticker-affixed fruits (s) showed significant lower disease incidence than control fruit (c). See FIG. 5F. This indicated the sticker did not change quality of Chok Anan mango fruit. The sticker improved the resistance of mango fruits towards disease infection and thus the shelf life of fruit can be prolonged. All of the control fruit were infected severely with disease by day 8, while only two sticker-affixed fruit out of five samples showed slight disease infection by day 6.

CONCLUSION

Stixfresh did not alter the quality of Chok Anan mango fruit during 8 days of ripening, either by applying the sticker before ethylene initiation or after ethylene initiation. The sticker has reduced disease incidence of fruit significantly, which indirectly could prolong the shelf life of fruit during marketing.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to Malaysian Patent Application No. 2017001748, filed Nov. 29, 2017, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for extending shelf-life of fresh produce, the method comprising: applying an anti-spoilage, freshness-preservation formulation to the fresh produce without directly contacting the fresh produce, wherein the anti-spoilage, freshness-preservation formulation is non-aqueous and comprises a salt melt including sodium chloride and an essential oil; and a waxy matrix in which the salt melt is homogeneously suspended, wherein the essential oil is almond oil, sweet almond oil, grapeseed oil, walnut oil, jojoba oil, olive oil, lavender oil, coriander oil, geranium oil, sweet basil oil or a mixture thereof.

2. The method of claim 1 wherein applying the anti-spoilage, freshness-preservation formulation to the fresh produce comprises contacting one or more self-adhesive stickers to a surface of the fresh produce, the one or more self-adhesive stickers having a coating of the anti-spoilage, freshness-preservation formulation, wherein the coating is on an opposite side of the self-adhesive stickers contacting the surface of the fresh produce.

3. The method of claim 1 wherein the essential oil includes one or more monounsaturated or polyunsaturated fatty acids.

4. The method of claim 1 wherein the waxy matrix comprises beeswax, paraffin, or a combination thereof.

5. The method of claim 1, wherein applying the anti-spoilage, freshness-preservation formulation to the fresh produce comprises applying the anti-spoilage, freshness-preservation formulation to a container housing the fresh produce, or a label or a tag attached to the fresh produce.

6. The method of claim 1, wherein the anti-spoilage, freshness-preservation formulation is within a container placed near the fresh produce.

7. A method for extending shelf-life of fresh produce, the method comprising: applying an anti-spoilage, freshness-preservation formulation to the fresh produce without directly contacting the fresh produce, wherein the anti-spoilage, freshness-preservation formulation is a homogenous and non-aqueous formulation comprising an essential oil and a waxy matrix, wherein the essential oil is almond oil, sweet almond oil, grapeseed oil, walnut oil, jojoba oil, olive oil, lavender oil, coriander oil, geranium oil, sweet basil oil or a mixture thereof.

8. The method of claim 7 wherein applying the anti-spoilage, freshness-preservation formulation to the fresh produce comprises contacting one or more self-adhesive stickers to a surface of the fresh produce, the one or more self-adhesive stickers having a coating of the anti-spoilage, freshness-preservation formulation, wherein the coating is on an opposite side of the self-adhesive stickers contacting the surface of the fresh produce.

9. The method of claim 7 wherein the essential oil includes one or more monounsaturated or polyunsaturated fatty acids.

10. The method of claim 7 wherein the waxy matrix comprises beeswax, paraffin, or a combination thereof.

11. The method of claim 7, wherein applying the anti-spoilage, freshness-preservation formulation to the fresh produce comprises applying the anti-spoilage, freshness-preservation formulation to a container housing the fresh produce, or a label or a tag attached to the fresh produce.

12. The method of claim 7, wherein the anti-spoilage, freshness-preservation formulation is within a container placed near the fresh produce.

\* \* \* \* \*